United States Patent
Wei et al.

(10) Patent No.: US 9,612,408 B2
(45) Date of Patent: Apr. 4, 2017

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Le-Peng Wei, Shenzhen (CN); Zhi-Ming Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/688,172

(22) Filed: Apr. 16, 2015

(65) Prior Publication Data
US 2016/0025936 A1    Jan. 28, 2016

(30) Foreign Application Priority Data
Jul. 25, 2014  (CN) .......................... 2014 1 0357908

(51) Int. Cl.
G02B 6/38    (2006.01)

(52) U.S. Cl.
CPC ........... *G02B 6/387* (2013.01); *G02B 6/3869* (2013.01); *G02B 6/3887* (2013.01); *G02B 6/3898* (2013.01); *G02B 6/3821* (2013.01)

(58) Field of Classification Search
None
See application file for complete search history.

(56) References Cited

U.S. PATENT DOCUMENTS

| | | | | |
|---|---|---|---|---|
| 5,129,023 A | * | 7/1992 | Anderson | G02B 6/3831 385/60 |
| 5,287,425 A | * | 2/1994 | Chang | G02B 6/3887 385/60 |
| 5,475,782 A | * | 12/1995 | Ziebol | G02B 6/3887 385/69 |
| 6,206,581 B1 | * | 3/2001 | Driscoll | G02B 6/3843 385/139 |
| 7,011,454 B2 | | 3/2006 | Caveney et al. | |
| 2002/0081077 A1 | * | 6/2002 | Nault | G02B 6/3843 385/78 |
| 2011/0002586 A1 | * | 1/2011 | Nhep | G02B 6/3887 385/62 |
| 2011/0158593 A1 | * | 6/2011 | Li | G02B 6/3821 385/81 |
| 2016/0025938 A1 | * | 1/2016 | Wei | G02B 6/3833 29/520 |
| 2016/0139343 A1 | * | 5/2016 | Dean, Jr. | G02B 6/3869 385/78 |

* cited by examiner

*Primary Examiner* — Mike Stahl
(74) *Attorney, Agent, or Firm* — Steven M. Reiss

(57) ABSTRACT

An optical fiber connector includes a fiber fixing unit configured for holding the optical fiber, a ferrule configured for receiving an end of the optical fiber, and a housing receiving and connected to the fiber fixing unit and the ferrule. The housing includes side walls, the side walls cooperatively form an end surface adjacent to the fiber fixing unit, the side walls define two opposite releasing slots, the releasing slots penetrate through the side walls along a direction parallel to the end surface and are open at the end surface.

3 Claims, 11 Drawing Sheets

OPTICAL FIBER CONNECTOR

FIELD

The present disclosure relates to communications technology, particularly to an optical fiber connector.

BACKGROUND

An optical fiber connector usually includes a fiber fixing member, a ferrule, and a housing. The housing receives the fiber fixing member and the ferrule.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
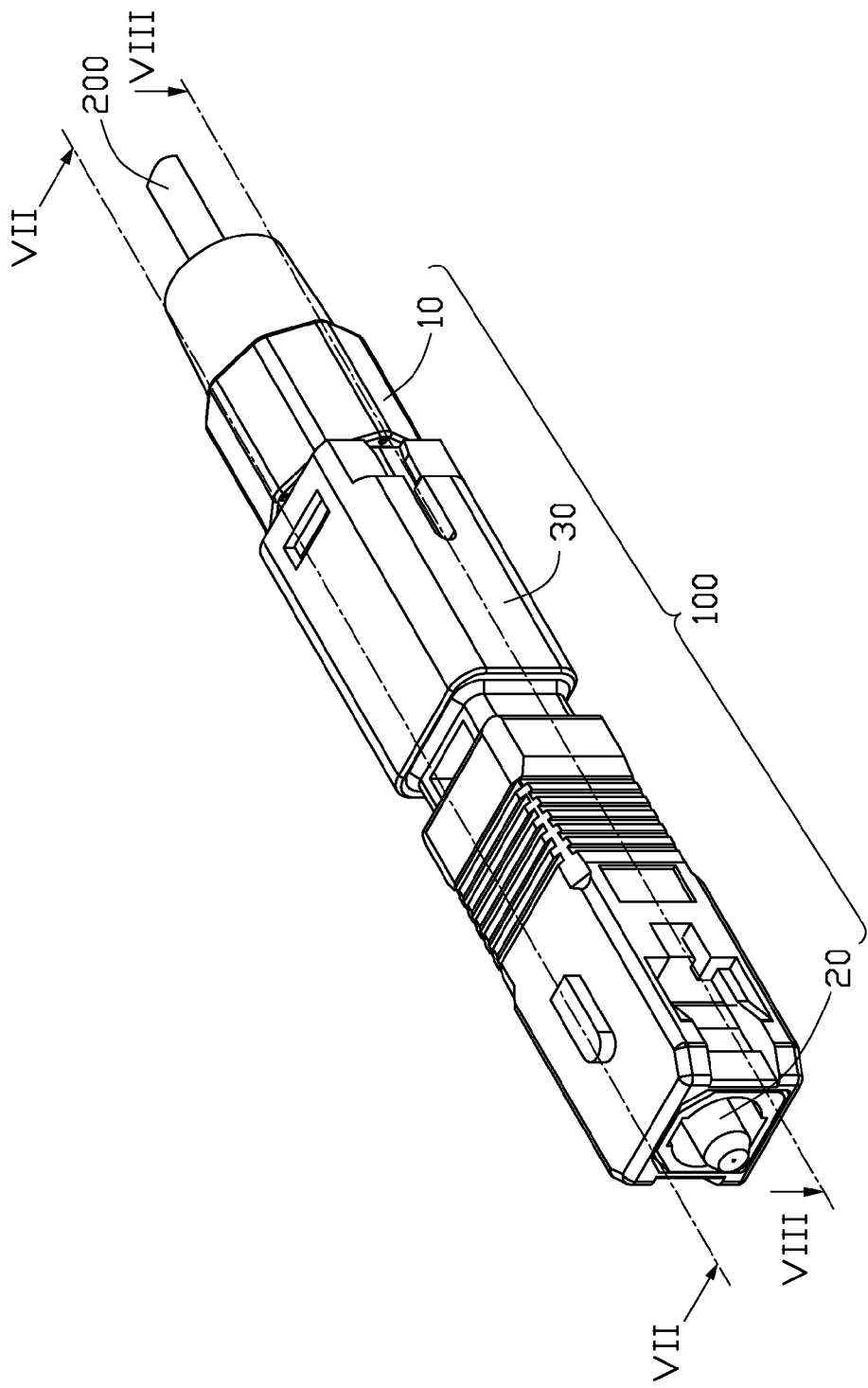
FIG. 1 is a schematic, isometric view of an optical fiber connector according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an optical fiber connector.

Figure 2:
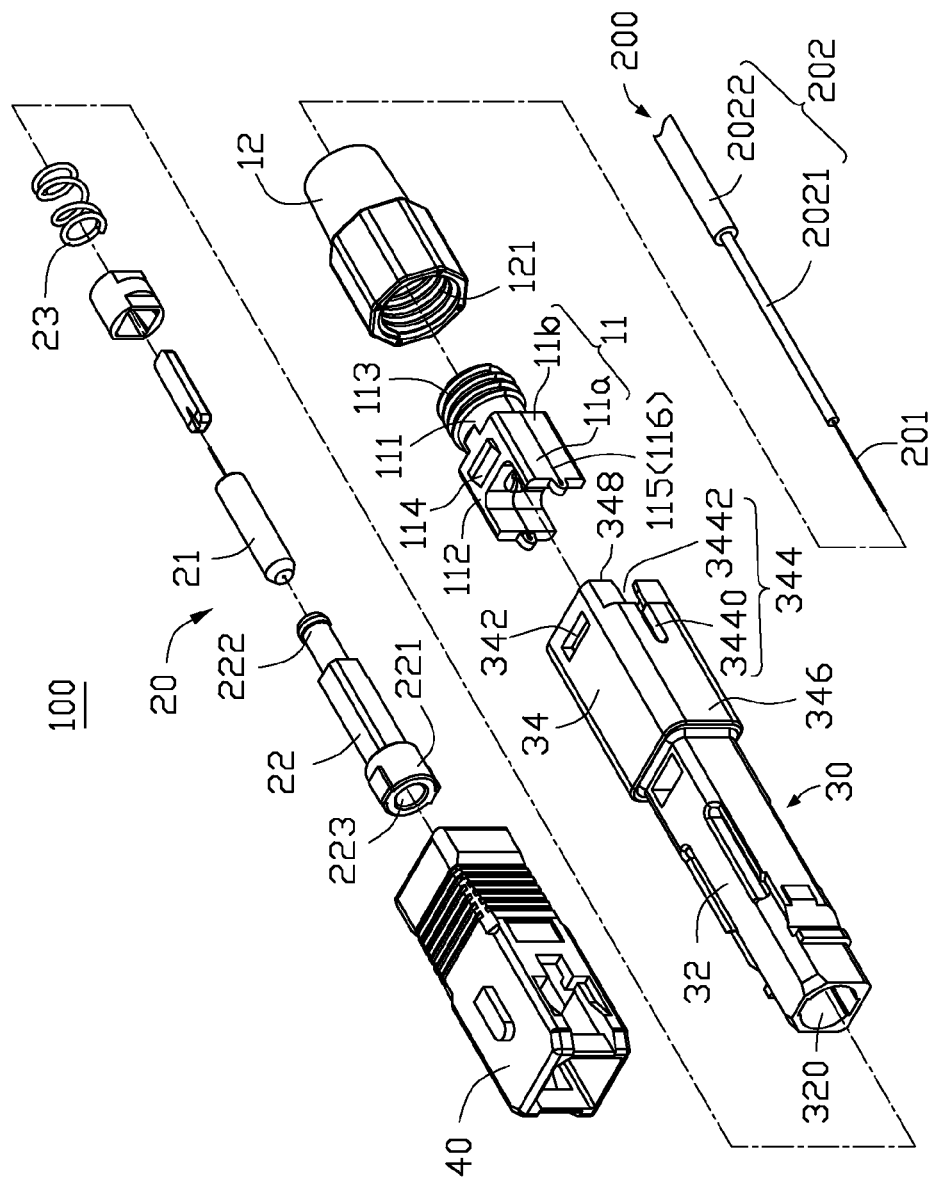
FIG. 2 is an exploded view of the optical fiber connector of FIG. 1.

FIGS. 1 and 2 illustrate an optical fiber connector 100 for receiving an optical fiber 200. The optical fiber connector 100 includes a fiber fixing unit 10, a ferrule 20 and a housing 30. The optical fiber 200 includes a core 201 and a cladding layer 202 surrounding the core 201. In this embodiment, the cladding layer 202 includes an inner cladding layer 2021 and an outer cladding layer 2022. Before being inserted into the optical fiber connector 100, the cladding layer 202 is peeled for a predetermined length to expose the core 201. In this embodiment, the outer cladding layer 2022 being peeled is longer than the inner cladding layer 2021 being peeled.

Figure 3:
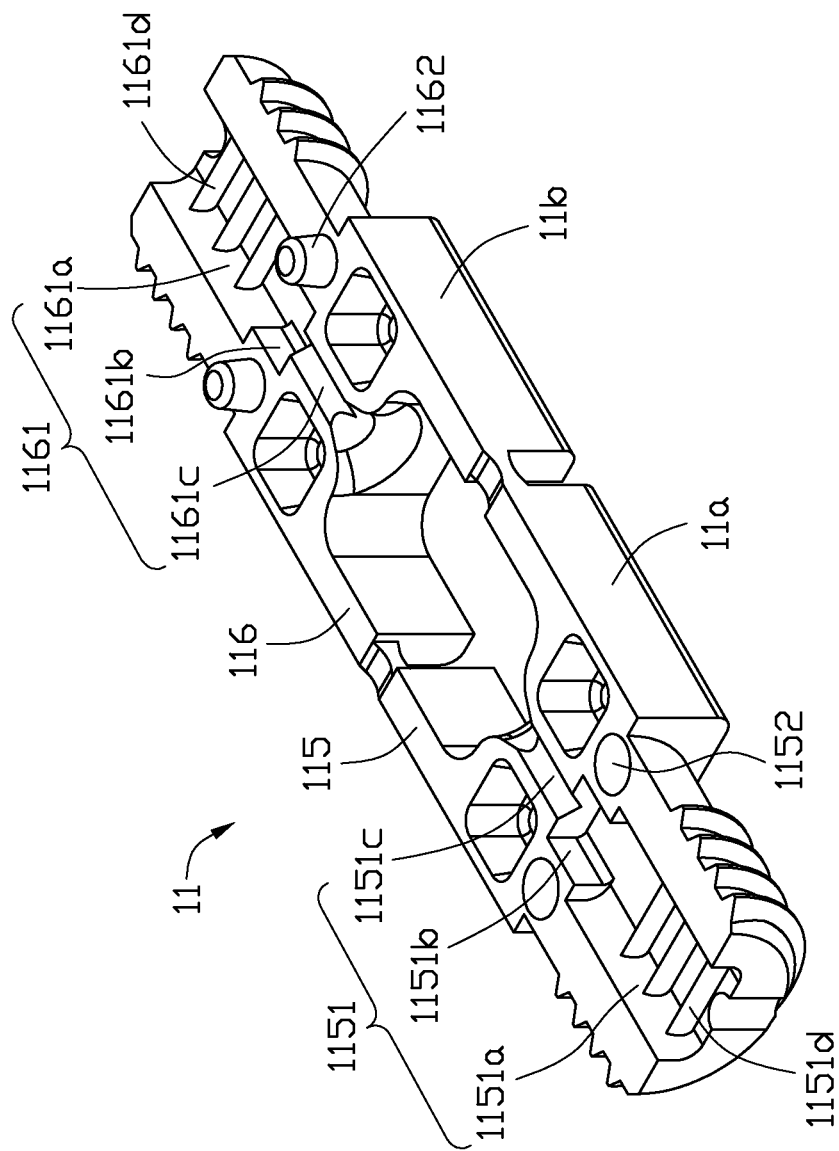
FIG. 3 is an exploded view of a fiber fixing unit of the optical fiber connector of FIG. 1.
Figure 4:
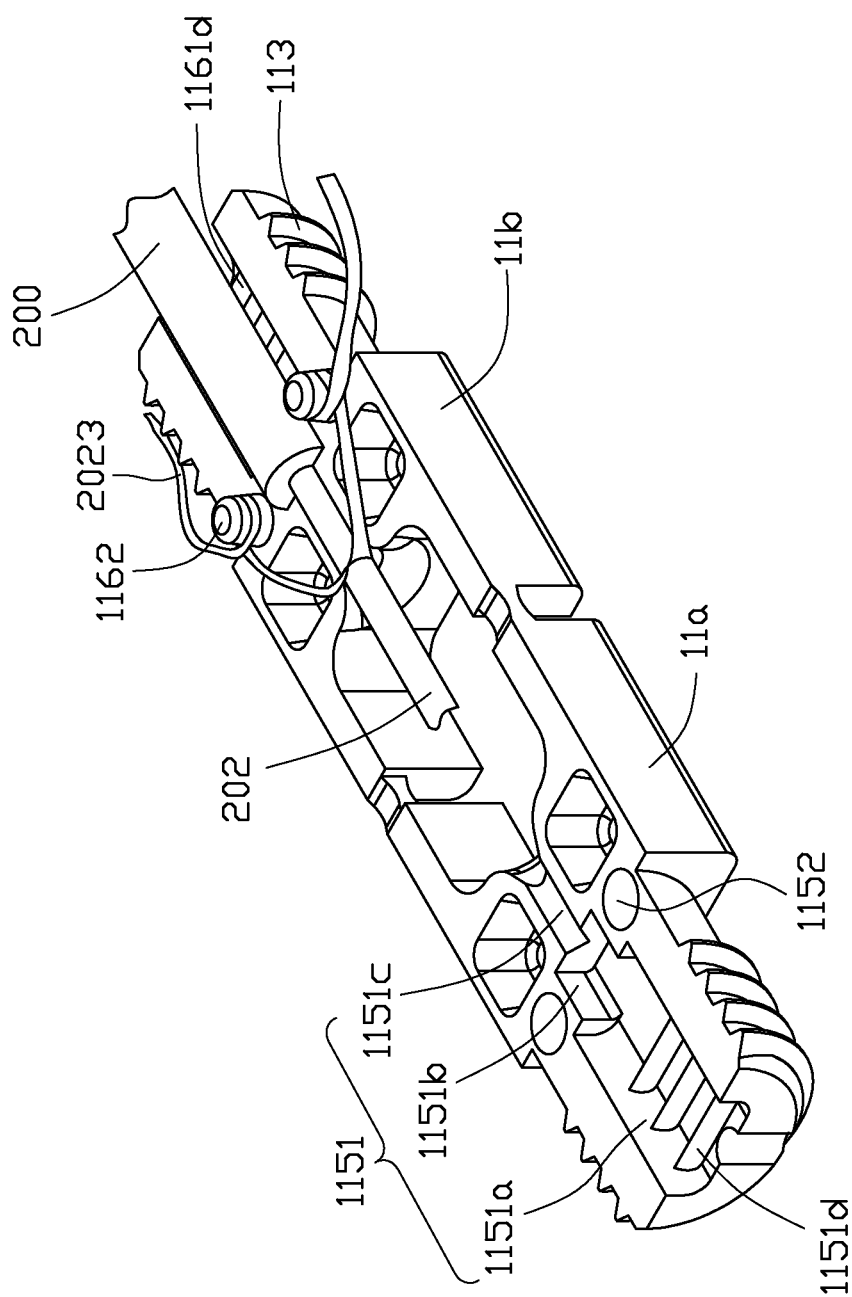
FIG. 4 is similar to FIG. 3, except for further including an optical fiber received in the fiber fixing unit.

FIGS. 2, 3 and 4 show the fiber fixing unit 10 in detail. The fiber fixing unit 10 is used for fixing the optical fiber 200. The fiber fixing unit 10 includes a clamping member 11 and a fixing sleeve 12. The clamping member 11 includes a first clamping portion 11a and a second clamping portion 11b buckled to the first clamping portion 11a. The first and second clamping portions 11a, 11b cooperatively form a first connecting end 111 facing the fixing sleeve 12 and a second connecting end 112 facing the housing 30. The first connecting end 111 is substantially cylindrical, and forms an outer thread 113. The second connecting end 112 is substantially a cube, and forms two projected locking blocks 114.

The first clamping portion 11a includes a first matching surface 115 facing the second clamping portion 11b. The first matching surface 115 defines a first mounting groove 1151 and two locating holes 1152. The first mounting groove 1151 extends through the first matching surface 115, and includes a first part 1151a, a second part 1151b, and a third part 1151c. The first part 1151a is adjacent to the first connecting end 111, the third part 1151c is adjacent to the second connecting end 112, and the second part 1151b is located between the first part 1151a and the third part 1151c. A diameter of the first part 1151a is bigger than that of the second part 1151b, and a diameter of the second part 1151b is bigger than that of the third part 1151c. The first, second, and third part 1151a, 1151b, and 1151c are used for clamping optical fibers of different sizes. Ribs 1151d are formed in the first part 1151a.

The structure of the second clamping portion 11b is similar to that of the first clamping portion 11a. In detail, the second clamping portion 11b includes a second matching surface 116. The second matching surface 116 defines a second mounting groove 1161. The second mounting groove 1161 includes a first part 1161a, a second part 1161b, and a third part 1161c. A diameter of the first part 1161a is bigger than that of the second part 1161b, and a diameter of the second part 1161b is bigger than that of the third part 1161c. Ribs 1161d are formed in the first part 1161a.

The second clamping portion 11b includes two locating rods 1162 configured for being inserted into the locating holes 1152.

The fixing sleeve 12 includes an inner thread 121 on an inner surface of the fixing sleeve 12. The inner thread 121 matches the outer thread 113.

The ferrule 20 is configured for optically coupling the optical fiber connector 100 to an external component. The ferrule 20 includes an insert core 21, a retainer 22 and an elastic member 23.

The insert core 21 is substantially a cylinder and is made of ceramics. The insert core 21 prevents the core 201 of the optical fiber 200 from damage.

The retainer 22 is a hollow rod, and includes a first end 221 and a second end 222 opposite to the first end 221. The retainer 22 defines a through hole 223 extending from the first end 221 to the second end 222. One end of the insert core 21 is inserted into the through hole 223 from the first end 221, and the other end of the insert core 21 is exposed out of the through hole 223.

The elastic member 23 sleeves over the second end 222. In this embodiment, the elastic member 23 is a spring.

The housing 30 includes a front housing 32 and a back housing 34 connected to the front housing 32. The front housing 32 defines a first receiving cavity 320 for receiving the retainer 22. The back housing 34 is substantially a hollow cube, and defines a second receiving cavity 340 (see FIGS. 5 and 6) communicating with the first receiving cavity 320. The back housing 34 includes four side walls 346 connected end to end and surrounding the second receiving cavity 340. The four side walls 346 cooperatively form an end surface 348 away from the front housing 32. The back housing 34 defines two locking grooves 342 corresponding to the locking blocks 114 on two opposite sidewalls 346, and two releasing slots 344 on the two other opposite sidewalls 346. The two releasing slots 344 penetrate through the sidewalls 346 along a direction parallel to the end surface 348, and are open at the end surface 348. In this embodiment, each releasing slot 344 includes a first slot 3440 near the front housing 32, and a second slot 3442 near the end surface 348. The first slot 3440 is communicated with the second slot 3442. A width of the second slot 3442 is bigger than that of the first slot 3440.

The optical fiber connector 100 further includes a sheath 40 sleeved over the front housing 32.

FIGS. 1, and 4-8 illustrate when in assembling, the cladding layer 202 is peeled to expose the core 201. The peeled cladding layer 202 is formed into strips 2023. One end of the optical fiber 200 with the strips 2023 is put in the second mounting groove 1161. The strips 2023 are wrapped around the locating rods 1162. The first clamping portion 11a and the second clamping portion 11b are buckled together and the locating rods 1162 are inserted into the locating hole 1152. The ribs 1151d, 1161d press the cladding layer 202 to prevent the optical fiber 200 from sliding. The inner thread 121 is engaged with the outer thread 113 to fix the fixing sleeve 12 on the clamping member 11. The strips 2023 are clamped between the inner thread 121 and the outer thread 113 to fix the optical fiber 200 on the fiber fixing unit 10 firmly.

After the optical fiber 200 is fixed on the fiber fixing unit 10, the exposed core 201 extending out of the fiber fixing unit 10 is cut to be a predetermined length.

Figure 5:
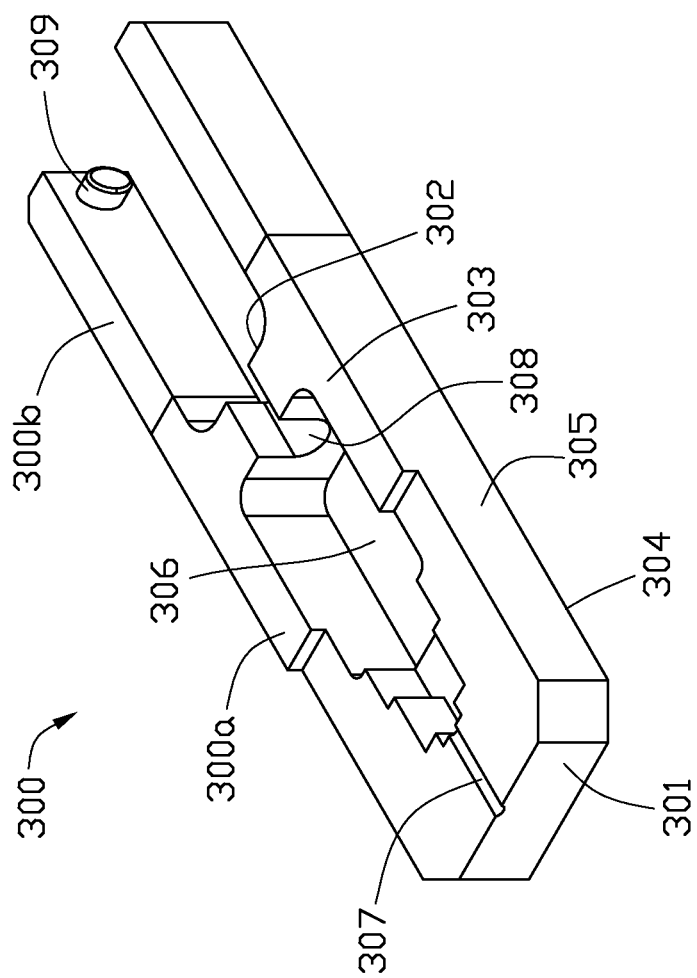
FIG. 5 is a schematic, isometric view of an assembling tool.
Figure 6:
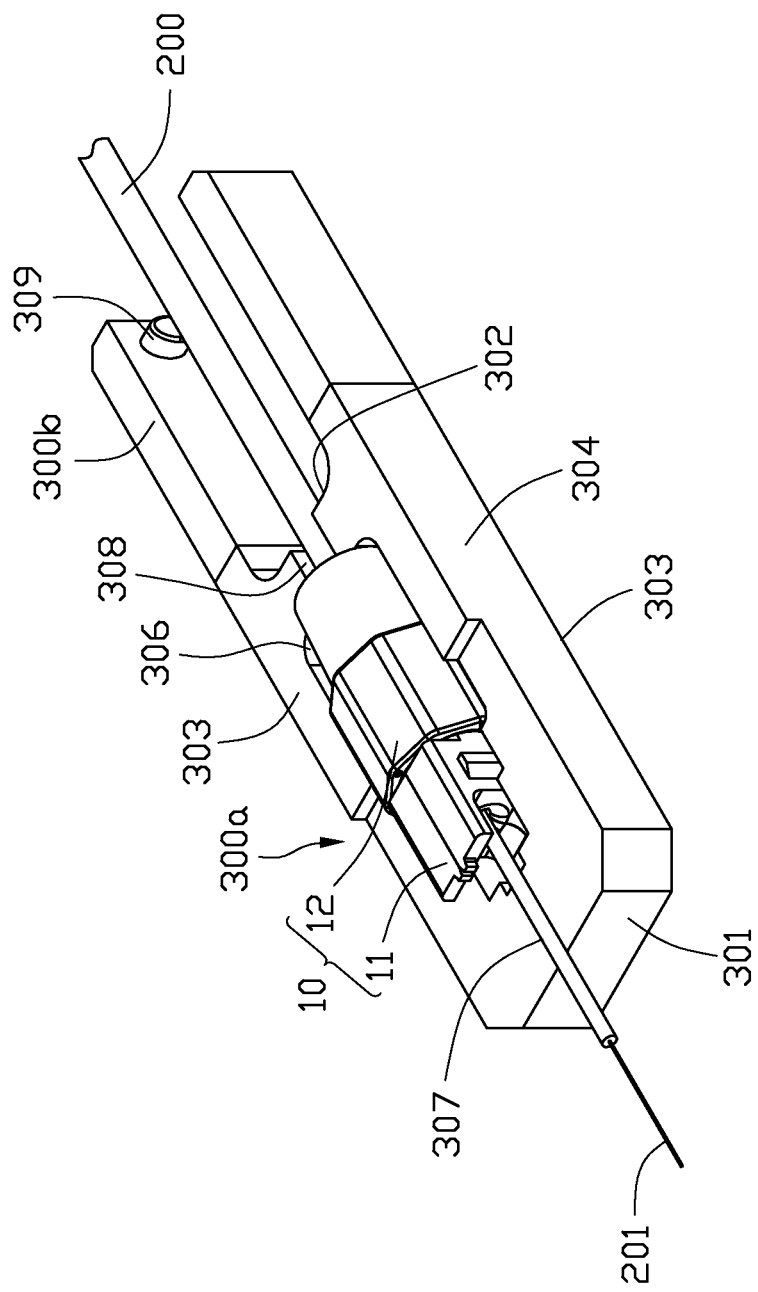
FIG. 6 is similar to FIG. 5, except for further including the fiber fixing member received in the assembling tool.
Figure 7:
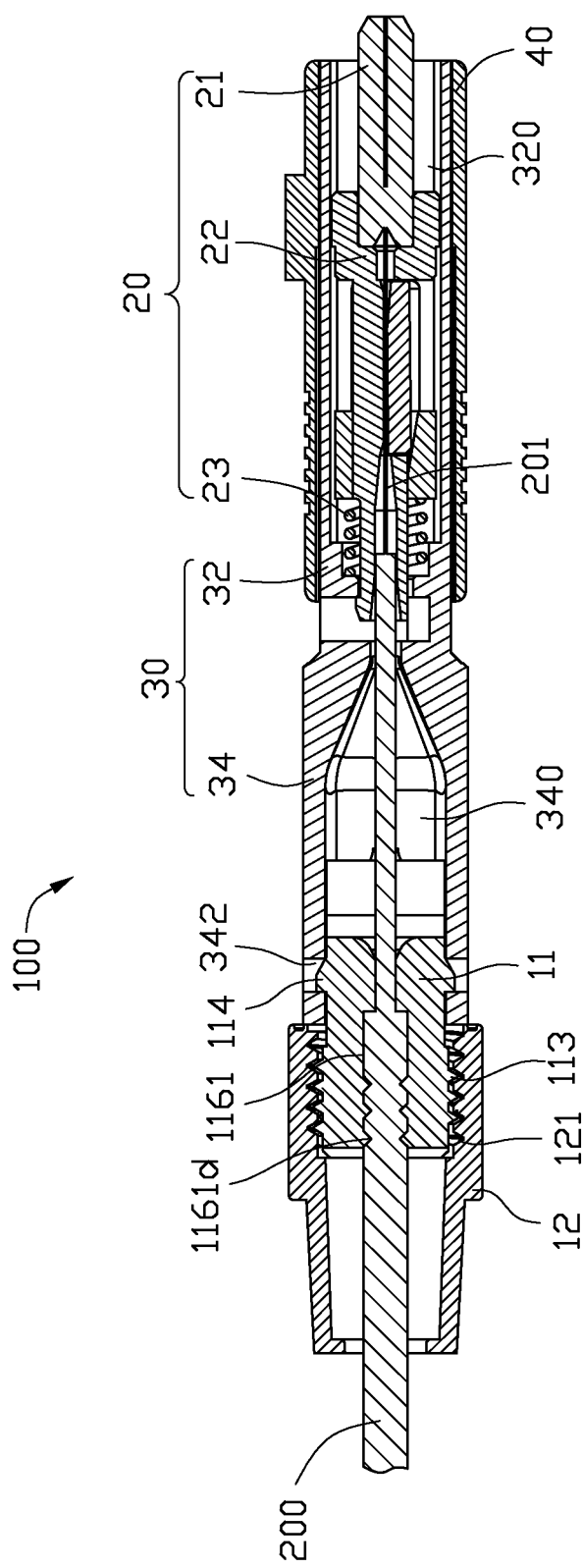
FIG. 7 is a sectional view taken along VII-VII line of FIG. 1.
Figure 8:
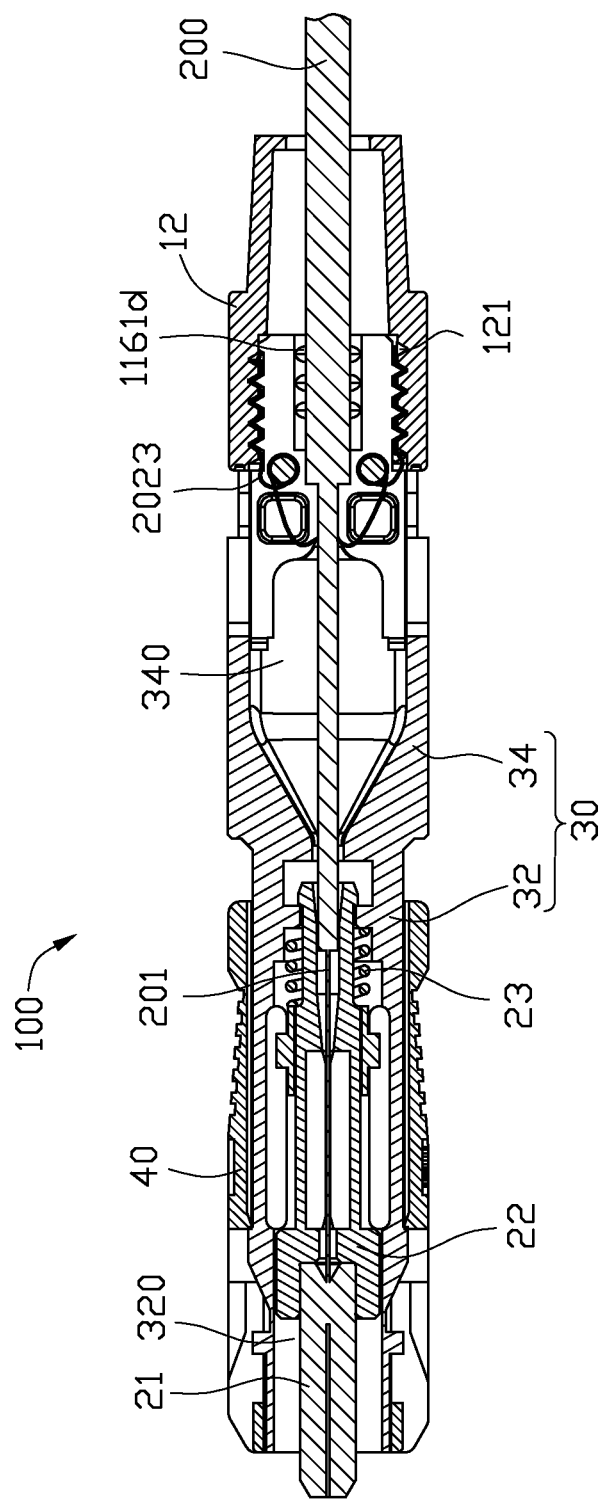
FIG. 8 is a sectional view taken along VIII-VIII line of FIG. 1.

FIGS. 5 and 6 show an assembling tool 300. The assembling tool 300 includes a main body 300a and two arms 300b extending from the main body 300a. The main body 300a is substantially a cube, and includes a first end surface 301, a second end surface 302 opposite to the first end surface 301, a top surface 303, a bottom surface 304 opposite to the top surface 303, and two side surfaces 305. In this embodiment, the first end surface 301 is parallel to the second end surface 302, the top surface 303 is parallel to the bottom surface 304, and the two side surfaces 305 are parallel to each other. The top surface 303, the bottom surface 304, and the side surfaces 305 are perpendicular to the first and second end surfaces 301, 302. The main body 300a defines an assembling space 306 for receiving and fixing the fiber fixing unit 10. A shape of the assembling space 306 corresponds to that of the fiber fixing unit 10, and a size of the assembling space 306 corresponds to that of the fiber fixing unit 10. The main body 300a further defines a first fiber supporting groove 307 and a second fiber supporting groove 308 both communicating with the assembling space 306. The first fiber supporting groove 307 is aligned with the second fiber supporting groove 308 and extends through first end surface 301. The second fiber supporting groove 308 extends through the second end surface 302. Cross-sectional surfaces of the first and second fiber supporting grooves 307, 308 perpendicular to an extending direction of the first and second fiber supporting grooves 307, 308 are U-shaped, and a size of the second fiber supporting groove 308 is bigger than the first fiber supporting groove 307.

The arms 300b are formed on the second end surface 302 and are adjacent to the side surfaces 305. The arms 300b are parallel to each other at a predetermined interval. The interval between the two arms 300b is bigger than a distance between the two side walls 346 which defines the releasing slots 344, so that the back housing 34 can be put between the two arms 300b. Each arm 300b includes a releasing block 309 at an inner surface facing the other arm 300b. A width of the releasing block 309 along a first direction parallel to the side surface 305 is different from a width of the releasing block 309 along a second direction parallel to the side surface 305 and perpendicular to the first direction. In this embodiment, a first width of the releasing block 309 along a direction perpendicular to the top surface 303 is bigger than a second width of the releasing block 309 along a direction parallel to the top surface 303. The first width of the releasing block 309 is bigger than the width of the first slot 3440, the second width of the releasing block 309 is smaller than the width of the first slot 3440, and the first width of the releasing block 309 is smaller than the width of the second slot 3442. The distance between the two releasing blocks 309 is smaller than the distance between the two sidewalls 346 which defines the releasing slots 344, so that when the back housing 34 is put between the two arms 300b, the releasing block 309 are inserted into the releasing slots 344.

The assembling tool 300 can be used in the process of cutting the optical fiber 200. The fiber fixing unit 10 carrying the optical fiber 200 is inserted into the assembling space 306 of the assembling tool 300. An end of the optical fiber 200 extending out of first end surface 301 is supported by the first fiber supporting groove 307. An end of the optical fiber 200 extending out of the second end surface 302 is supported by the second fiber supporting groove 308. The assembling tool 300 is then put into a cut device (not shown) and the first end surface 301 is used as a reference surface for cutting the core 201. In this way, the core 201 out of the fiber fixing unit 10 can be cut to a predetermined length.

FIGS. 1-2 and 7-8 illustrate the ferrule 20 is received in the first receiving cavity 320 and can elastically move relative to the housing 30. In detail, the second end 222 of the retainer 22 is inserted into the front housing 32, and the elastic member 23 is compressed between the ferrule 20 and the front housing 32. The front housing 32 locks the second end 222 for preventing the retainer 22 from moving out of the front housing 32. When an external force is applied to the insert core 21 during the process of connecting the optical fiber connector 100 to another device, the insert core 21 can move towards the back housing 34 and the elastic member 23 can absorb the movement of the insert core 21. In this way, the external force will not damage the insert core 21.

The second connecting end 112 of the fiber fixing unit 10 is inserted into the second receiving cavity 340 and the locking blocks 114 are engaged in the locking grooves 342 to fix the fiber fixing unit 10 in the housing 30. The core 201 is aligned with the insert core 21 and forms an arch. As the length of the core 201 out of the fiber fixing unit 10 is predetermined, the size of the arch is also predetermined. Thus, there is no need to pull the optical fiber 200 back to adjust the arch to a predetermined size.

Figure 9:
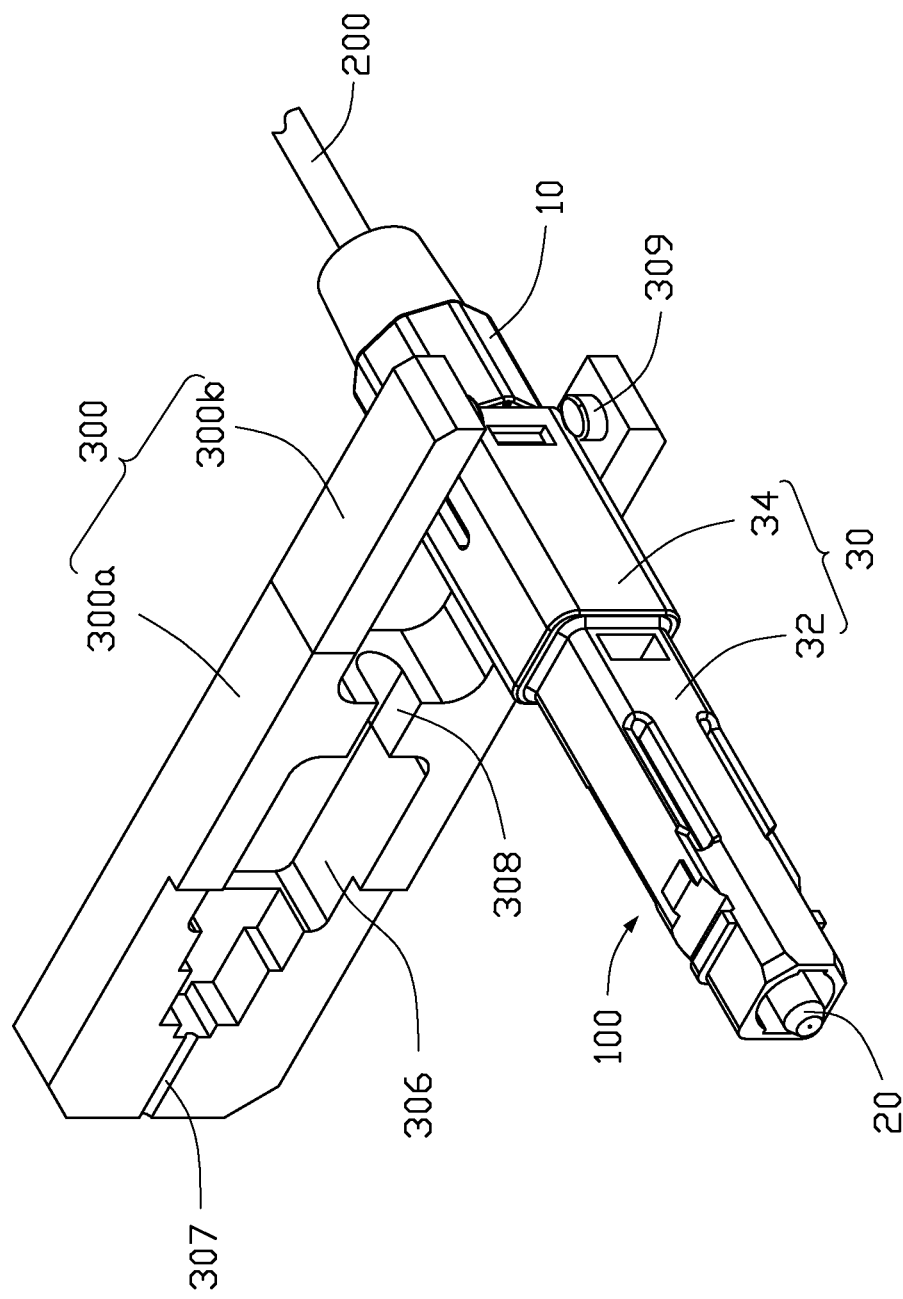
FIG. 9 is a schematic, isometric view showing the assembling tool of FIG. 5 inserted into the optical fiber connector of FIG. 1.
Figure 10:
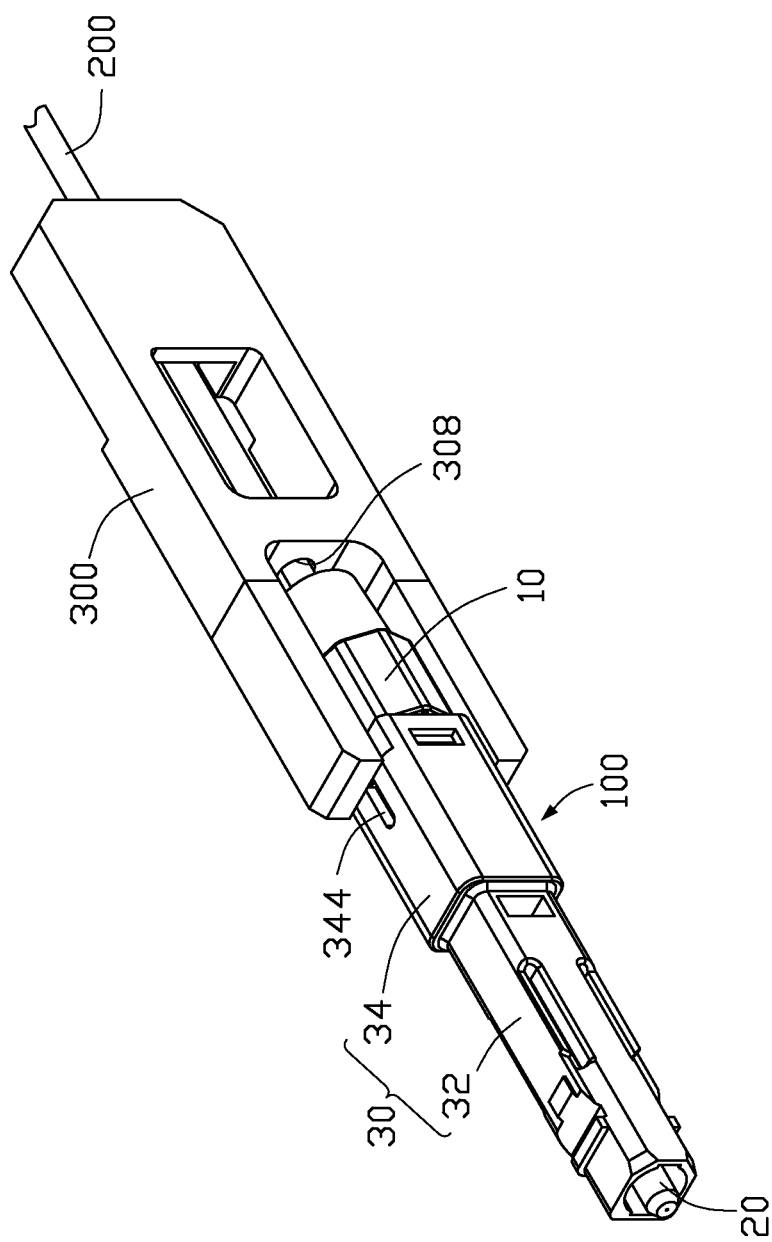
FIG. 10 is similar to FIG. 9, but showing the assembling tool is rotated at 90 degrees.
Figure 11:
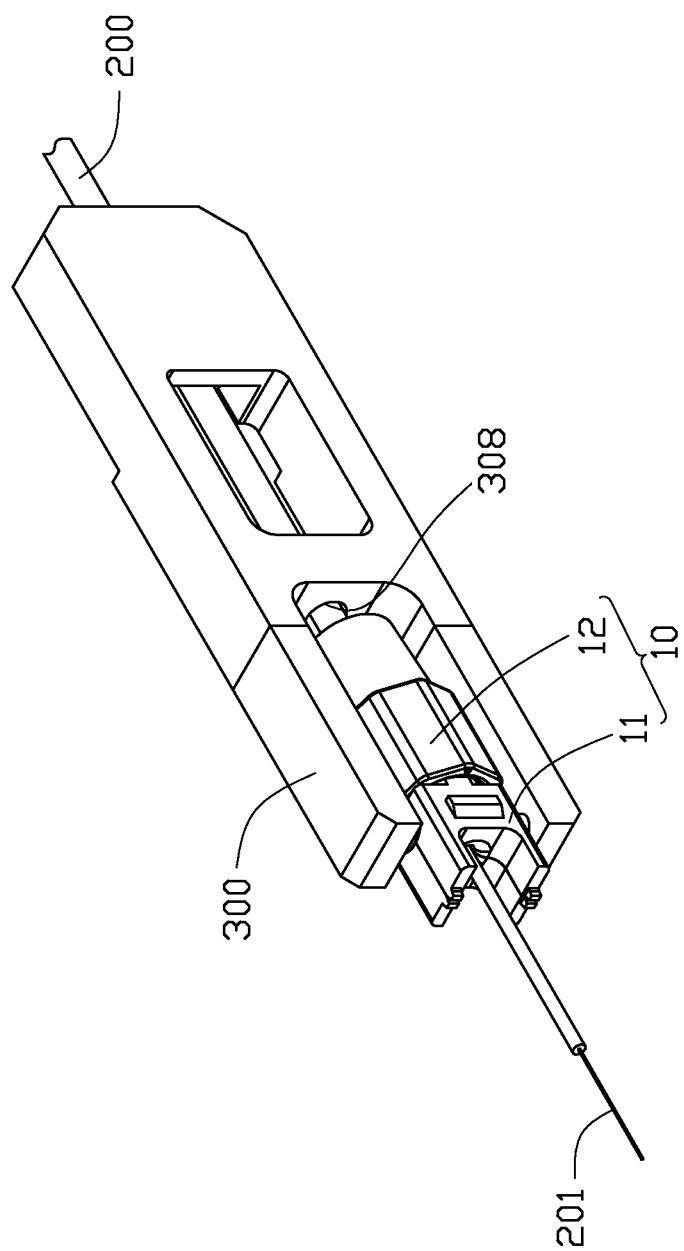
FIG. 11 is a schematic, isometric view showing the assembling tool holding the fiber fixing unit.

FIGS. 9-11 illustrate the optical fiber connector 100 can be detached quickly by using the assembling tool 300. First, the assembling tool 300 is put at a first position so that a length of the assembling tool 300 runs perpendicular to a length of the optical fiber connector 100, and the releasing blocks 309 are inserted into the releasing slots 344. In detail, the releasing blocks 309 are inserted into the first slots 3440. Then the assembling tool 300 is rotated to a second position so that the length of the assembling tool 300 is running parallel to the length of the optical fiber connector 100. As the first widths of the releasing blocks 309 are bigger than the widths of the first slots 3440, the releasing slots 344 will be opened and the locking blocks 114 will be disengaged from the locking grooves 342. The fiber fixing unit 10 is positioned between the two arms 330b and the optical fiber 200 away from the clamping member 11 is supported in the second fiber supporting groove 308. At last, the arm 300b can be held to pull the fiber fixing unit 10 out from the housing 30.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. An optical fiber connector for holding an optical fiber, the optical fiber connector comprising:
   a fiber fixing unit configured for holding the optical fiber;
   a ferrule configured for receiving an end of the optical fiber; and
   a housing receiving and connected to the fiber fixing unit and the ferrule, wherein the housing comprises side walls, the side walls cooperatively form an end surface adjacent to the fiber fixing unit, the side walls define two opposite releasing slots, the releasing slots penetrate through the side walls along a direction parallel to the end surface and are open at the end surface, each releasing slot comprising a first slot and a second slot adjacent to the end surface relative to the first slot, the second slot is communicated with the first slot, and a width of the second slot is bigger than that of the first slot;
   wherein the housing comprises a front housing and a back housing connected to the front housing, the front housing defines a first receiving cavity for receiving the ferrule, and the back housing defines a second receiving cavity for receiving the fiber fixing unit, the side walls surround the second receiving cavity.

2. The optical fiber connector of claim 1, wherein the side walls further define two opposite locking grooves, the fiber fixing unit comprises two locking blocks for engaging with the locking grooves.

3. The optical fiber connector of claim 2, wherein the side walls defining the releasing slots are different from the side walls defining the locking grooves.

* * * * *